March 17, 1936.　　　D. A. FRYER　　　2,034,092
SPRING SEAT
Filed Aug. 25, 1933
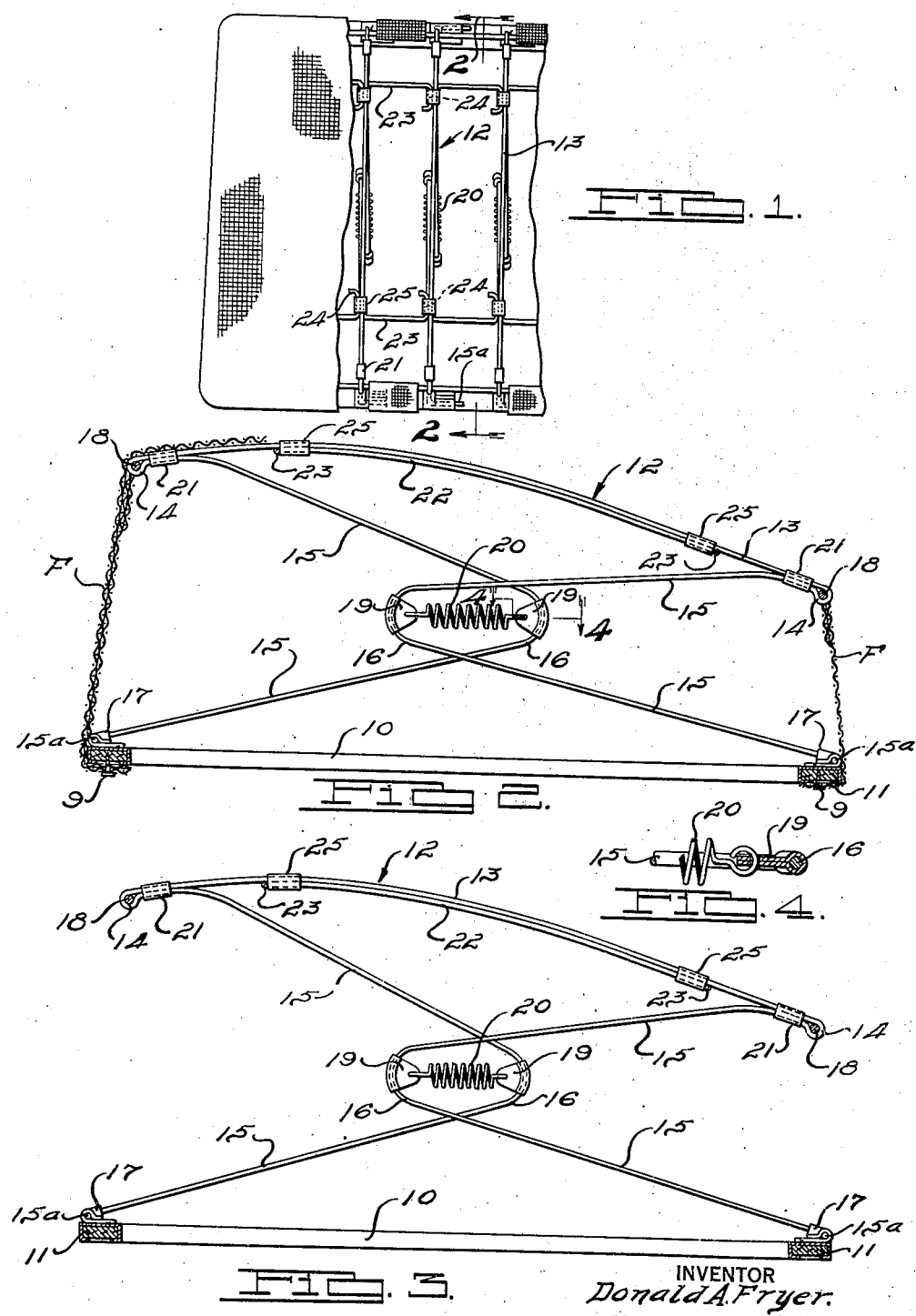
INVENTOR
Donald A. Fryer.
BY
Dike, Calver & Gray
ATTORNEYS.

Patented Mar. 17, 1936

2,034,092

UNITED STATES PATENT OFFICE 2,034,092

SPRING SEAT

Donald A. Fryer, Detroit, Mich., assignor to Briggs Manufacturing Company, Detroit, Mich., a corporation of Michigan Application August 25, 1933, Serial No. 686,795

5 Claims. (Cl. 155—179)

This invention relates to spring or cushion seats or back rests, particularly, although not exclusively, adapted for automobiles, an object of the invention being to provide a spring seat structure, as well as a back rest, constructed in an improved manner whereby the use of conventional coiled springs is eliminated, while at the same time a spring or cushion seat is provided which will secure the maximum comfort to the occupant of the vehicle.

A further object of the invention is to provide an improved spring or cushion seat as well as a back rest, which will be simplified in construction, relatively economical to manufacture, durable in use, and relatively light in weight as compared with conventional automobile seat units, whereby a substantial reduction in weight may be obtained, substantial economies effected, and maximum riding qualities maintained.

Another object of the invention is to provide a simplified and relatively inexpensive, light spring structure for a seat or back having novel means for resisting the compression of the spring members or units and thereby enhancing the resilient qualities of the structure.

Other objects of this invention will appear in the following description and appended claims, reference being had to the accompanying drawing forming a part of this specification wherein like reference characters designate corresponding parts in the several views.

Fig. 1 is a plan view, partly broken away, showing one form of spring structure made in accordance with the invention.

Fig. 2 is a transverse vertical section, partly in elevation, taken substantially along the line 2—2 of Fig. 1.

Fig. 3 is a transverse elevational view, partly in section, showing the parts in position before compression.

Fig. 4 is a sectional view, partly in elevation, taken substantially along the line 4—4 of Fig. 2.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The spring structure of my invention includes a channel formed base or supporting member 10 having wood inserts 11 providing tacking strips. Supported by the base are a series or plurality of independent, transversely extending wire formed spring members or units, one such being shown as a whole at 12. Each unit is formed from a single piece of wire which is shaped to provide an upper course 13 which extends substantially throughout the width of the spring structure. The wire is bent back upon itself to provide loops 14 at opposite ends of the course 13 and is extended inwardly at opposite sides to provide bow members or leg sections comprising diverging side portions 15 and over-lapping inner ends or portions 16. The free ends of the side members 15 may be attached to the base 10 by means of metal sockets or clips 17. The sockets may be secured to the channel base in any suitable manner, as by welding or riveting. The extremities or free ends of the leg portions 15 may be bent or turned at right angles to provide portions 15a which fit into the socket members. A border wire 18 extends through the loops 14 at each side of the spring members or units 12 and serves to interconnect the series.

In the present instance tensioning means is employed to resist the spreading of the overlapping ends 16 upon compressing the bow-like leg sections as a result of downward pressure on the upper courses 13. One form of tensioning means is shown, by way of example, in the drawing, including a tension spring 20 and a pair of metallic attaching clips or straps 19. Each clip 19 is preferably formed from a single piece of metal which is shaped to receive the curved apex of the bowed leg section. The tension spring 20 is secured at opposite ends to the opposed clip members 19. As shown, metal clamping bands 21 reinforce the ends of the courses and are located adjacent the loops 14.

It may also be desirable to provide means for reinforcing the courses 13 and for maintaining the individual transverse spring members or units in predetermined spaced relation. For this purpose I have provided a series or plurality of members for interconnecting the courses. These members may be of any preferred form, and as shown in the drawing for purposes of illustration, each comprises a main body portion 22 which extends transversely of the spring structure and preferably substantially parallel to one of the courses 13, side portions 23 which extend at right angles to the body portion, and legs 24 which extend substantially parallel to an adjacent course 13. The sides 23 are of a length corresponding to the distance between each pair of courses 13. Thus it will be seen, that the spacer members provide two portions which cooperate with and extend parallel to each adjacent pair of courses so that each course and a pair of spacer members at opposite sides thereof may be connected together by a common metal band or the like 25. This construction permits easy and quick attachment of the reinforcing and spacing members to the spring courses 13.

The spring structure may be covered with any suitable type of upholstery material and, as shown in Fig. 2, the transverse spring members or units are held in position relative to the base by means of fabric F which is secured to the border wires 18 and to the tacking strips 11 in any suitable manner, as by means of upholstery tacks 9. In ordinary practice the spring members are placed under suitable compression when applying the fabric F.

From the foregoing it will be seen that I have provided a novel spring construction which is adapted for use in connection with spring seats, seat backs, or the like, which is of relatively simple construction, contains relatively few parts, and provides a resilient structure having sufficient strength, yieldability and durability as to render it capable of performing the work of previous more costly and complicated constructions.

I claim:

1. A spring structure comprising a base, a series of transversely extending wire formed spring members each formed from a single piece of wire, each of said spring members having an upper course terminating in a pair of bowed leg members projecting inwardly from opposite ends of said course and having overlapping portions, means connecting the free ends of said leg members to said base, and tensioning means connecting said overlapping portions to resist spreading thereof.

2. A spring structure comprising a base, a series of transversely extending wire formed spring members, each of said spring members having an upper course and a pair of bowed leg members extending inwardly from opposite ends of said course and having overlapping portions, each leg member comprising upper and lower diverging portions, means connecting the free ends of said leg members to said base, and tensioning means connecting said overlapping portions to resist spreading movement and downward displacement of said leg members.

3. A spring structure comprising a base, a series of transversely extending wire formed spring members each formed from a single piece of wire, each of said spring members having an upper course terminating in a pair of inwardly projecting relatively long bowed leg members having overlapping portions, means connecting the free ends of said leg members to said base, clips attached to the overlapping portions of said leg members, and a tension spring connecting said clips to resist outward movement of said overlapping portions when said upper courses are subjected to pressure.

4. A spring structure comprising a base, a series of transversely extending wire formed spring members, each of said spring members having an upper course provided with looped ends and a pair of inwardly projecting bowed leg members having overlapping portions, a border wire extending through said loops, means connecting the free ends of said leg members to said base, and tensioning means connecting said overlapping portions to resist outward movement of said portions when weight is applied to said spring members.

5. A spring structure comprising a frame and a series of transversely extending wire formed spring members each formed from a single piece of wire and having an upper course extending substantially the width of the structure, each spring member being bent at the ends of said courses to provide a pair of inwardly projecting bows having overlapping portions and providing leg sections connected to said frame, and tensioning means connecting said overlapping portions and resisting the spreading thereof when weight is applied to said spring structure.

DONALD A. FRYER.